Feb. 27, 1923.
G. A. BUSH
1,446,613
RUNNING TIME INDICATOR FOR VEHICLES
Filed July 12, 1920
2 sheets-sheet 1
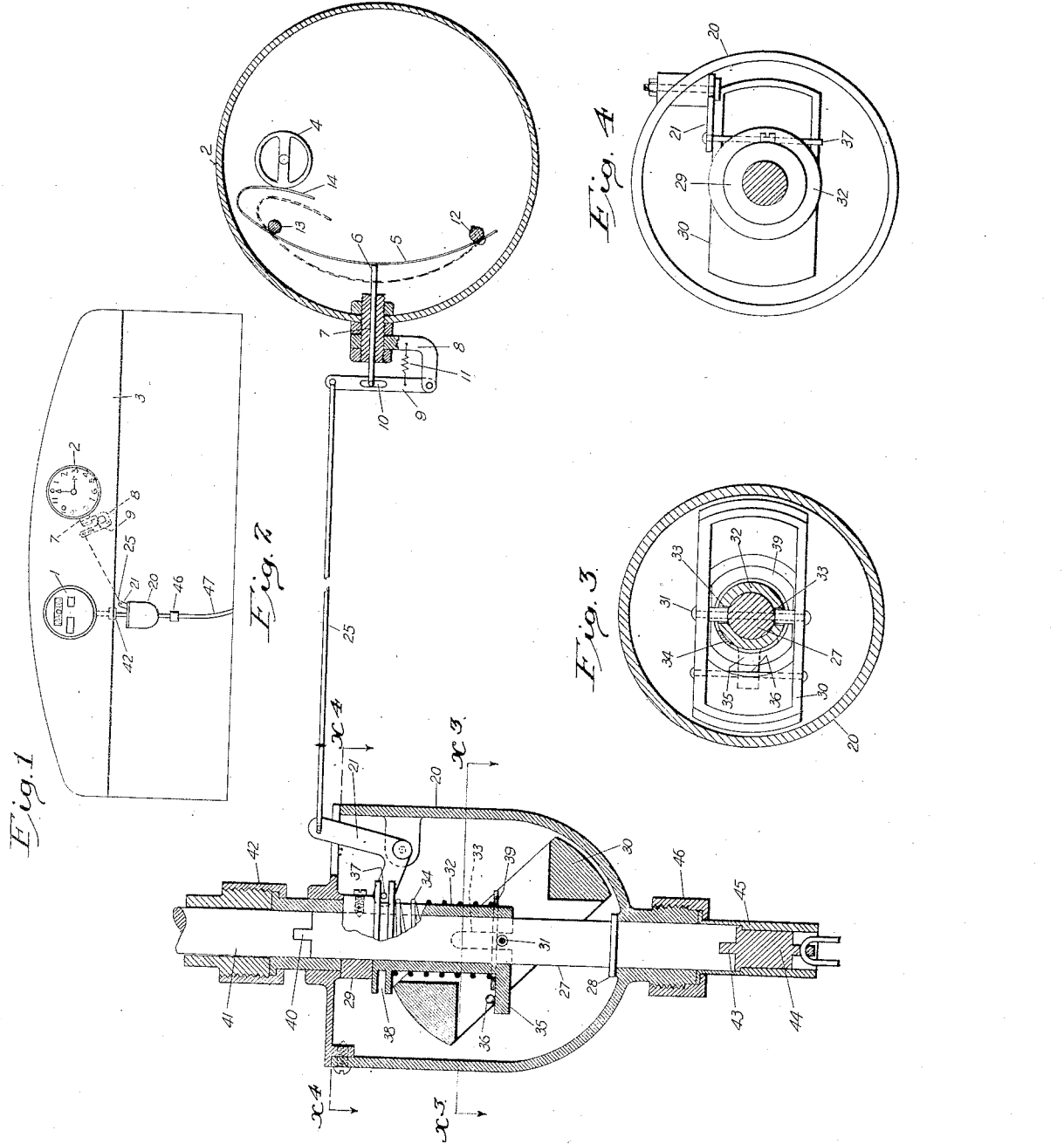
INVENTOR.
Grant A Bush
BY Frederick W Ryan
ATTORNEY INVENTOR.
Grant A. Bush
BY Frederick W. Hyon
ATTORNEY Patented Feb. 27, 1923.

1,446,613

UNITED STATES PATENT OFFICE.

GRANT A. BUSH, OF SAN DIEGO, CALIFORNIA.

RUNNING-TIME INDICATOR FOR VEHICLES.

Application filed July 12, 1920. Serial No. 395,561.

*To all whom it may concern:*

Be it known that I, GRANT A. BUSH, a citizen of the United States, residing at San Diego, in the county of San Diego and State of California, have invented a new and useful Running-Time Indicator for Vehicles, of which the following is a specification.

This invention relates to a running time indicator for vehicles and is more particularly directed to an indicator comprising a clock mechanism which is permitted to run only when the vehicle is traveling.

The object of the invention is to provide a device which indicates the time during which the vehicle is traveling and which is rendered inactive whenever the vehicle is stopped.

Another object is to provide a means for stopping the time recording mechanism which means when released imparts a starting impulse to said mechanism.

Another object is to connect a device of the above character to the drive shaft of a speedometer so that the rotation of said shaft releases the clock mechanism.

Another object is to provide a clock mechanism associated with means normally stopping said mechanism and to provide a control device operatively connected with the running gear of the vehicle and functioning to release the clock mechanism during the travel of the vehicle.

Another object is to provide a governor controlled electrically operated stop device for a clock mechanism.

Various other objects and advantages will be more fully apparent from the following description of the accompanying drawings which form a part of this disclosure, and which illustrate a preferred form of embodiment of the invention.

Of the drawings:

Figure 1 is an elevation of the instrument board of an automobile showing the device of the present invention applied thereto.

Fig. 2 is an enlarged section through the clock and control mechanism, showing only such parts of the clock mechanism as is necessary to a full understanding of the device.

Fig. 3 is a section on line $x^3$—$x^3$ of Fig. 2, and

Fig. 4 is a section on line $x^4$—$x^4$ of Fig. 2.

Figure 5:
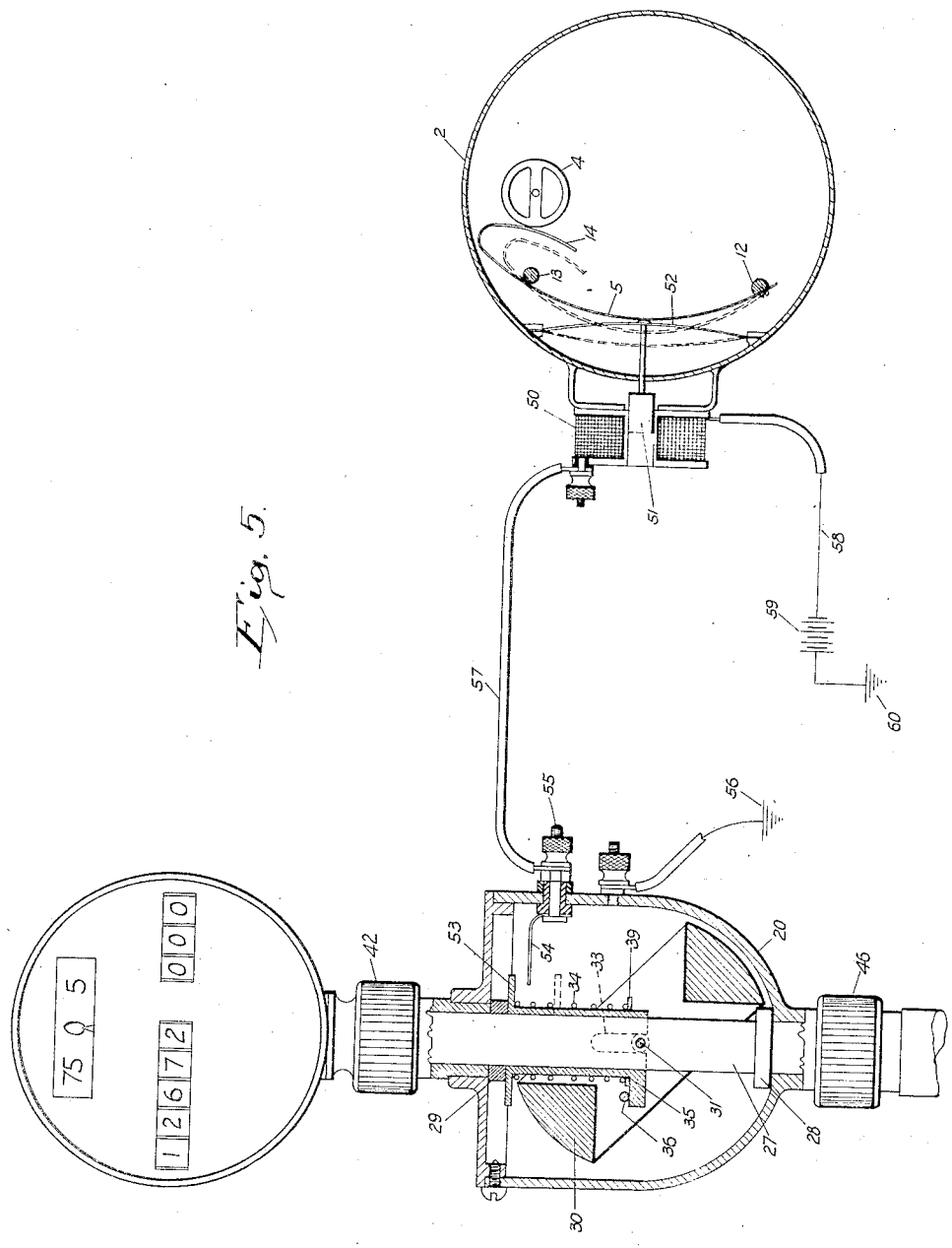
Fig. 5 is a view similar to Fig. 2 showing means for electrically operating the stop mechanism.

The device herein disclosed has its utility in the recording of the running time of the vehicle and is arranged so that the movement of the running gear of the vehicle causes a release of the clock mechanism to record the time during which the vehicle is traveling, and upon a stopping of the vehicle a stop device immediately functions to stop the clock mechanism so that the time during which the vehicle is standing still, will not be recorded by the clock.

For instance, if it is desired to ascertain the actual running time between a point of departure A and a destination point B, the hands of the clock mechanism will be manually set to the zero indicating character on the clock dial, and the speedometer trip recording wheels set to zero. A governor mechanism is connected with the clock stopping device or brake and is in driving connection with the speedometer shaft, or may be independently connected to any moving element of the running gear of the vehicle. The term running gear as herein used will be understood to designate the moving parts of the vehicle which move only when the vehicle is traveling, in a motor driven vehicle these parts will include the ground wheels and all driven parts between said wheels and the clutch, but not those parts which are driven by the motor when the car is standing still.

With the clock hands and the speedometer set as above explained, a starting of the vehicle will cause the governor to function to release the clock mechanism whereupon the clock will start to run and record the traveling time. The governor is so arranged that as long as it is driven by said running gear it will maintain the stop device in an ineffective position. Now consider that a stop is made at a station C intermediate points A and B to procure supplies. Upon stopping the vehicle at station C the governor becomes idle and the clock stopping device immediately functions to stop the clock preventing a recording of standing time. Likewise other stops may be made during the trip with a consequent stopping and subsequent restarting of the clock mechanism. Upon arriving at the destination B the length of the trip is ascertained by a reading of the speedometer and the running time or the correct elapsed time required to travel the trip mileage as indicated on the speedometer, is obtained by a reading of the clock.

If the clock hands are positioned as in Fig. 1, the elapsed running time of the trip is three hours, and if the speedometer registers sixty-five miles for the trip, the driver can ascertain that he has traveled sixty-five miles between points A and B, in three hours exclusive of all stops. It is, therefore, evident that the clock mechanism is in this instance utilized as a time recorder rather than as a time indicator indicating the time of day, and that the time of day has no particular bearing on the subject matter herein.

With particular reference to the drawings my preferred form of mechanism utilized in the accomplishment of the novel results above outlined, will be described, it being understood that various modifications and changes therein residing within the range of engineering skill may be made without departing from the broad scope of the invention.

In the drawings, 1 designates a standard type of speedometer and 2 designates a clock mechanism, both being preferably mounted on an instrument board 3 in spaced relation. The clock has the usual hour and minute hands and is of standard construction excepting that the dial has a zero character in place of the usual 12 o'clock indication, and also excepting for the addition of a stop or brake device. In Figure 2 there is shown only the balance wheel 4 of the clock mechanism, as it is believed that detailed illustration of the entire clock mechanism would herein be superfluous and would tend to confuse rather than simplify the disclosure. The function of the balance wheel of the standard clock is now well known in the art and it is also well known that a very slight pressure thereon is sufficient to cause the clock to be stopped, and that under ordinary conditions, upon a release of said pressure the clock will automatically start to run.

The stop device is preferably constructed with a spring mounted so that it tends to assume a bow-form so that the portion or engaging shoe of the stop member which cooperates with the moving part of the clock mechanism is normally withdrawn from engagement. It is also constructed so that when the stop member moves from its engaging position to its withdrawn position it exerts a slight wiping action on the balance wheel, that is to say, it exerts a tangential force on the rim of the balance wheel which will always be effective to start the clock mechanism.

The stop device in the present instance comprises a brake member 5 which is operated by a plunger 6 slidable within a bushing 7 attached to the clock case. This member 6 is controlled by the vehicle through suitable means such as a governor. Projecting downwardly and outwardly from the bushing 7 is an arm 8 to which is pivotally connected a lever 9 having a vertical slot 10 in which engages the laterally bent outer end of the plunger 6. A spring 11 interposed between the arm 8 and the lever 9 exerts its tension to yieldingly maintain the plunger in inner position. The brake or stop member 5 is preferably formed of leaf spring stock and is of bowed formation, its tension normally tending to bring the opposite ends together. One end of said member is fixed to a stationary stud 12 and the opposite end portion engages a second stationary stud 13 with its free end bent back to form a wheel engaging limb 14. In the position shown in full lines in Figure 2 the side portion of the stop member has been forced inward by the plunger 6 and as the ends of said member are maintained against lateral movement by the studs 12—13, this forcing inwardly of the medial bowed portion of the spring stop member will cause its ends to be relatively separated, the free end portion sliding on the stud 13 and its brake limb 14 being brought into engagement with the balance wheel 4 to stop the clock. This movement of the stop member is of an extent, which is sufficient to engage the brake limb 14 against the balance wheel and to cause a further movement tending to compress the limb 14 towards the body of the stop member so that a delicate adjustment is rendered unnecessary and further to store energy in the limb 14 for the subsequent function of imparting a starting impulse to the balance wheel upon release of the stop member. When the plunger 6 is drawn outwardly to release the stop member 5, said member will automatically flex to its normal position as shown in dotted lines in Fig. 2, the free end thereof being withdrawn from the balance wheel 4 in an approximate tangential direction. During this movement, the energy stored in the limb 14 will cause said limb to hug the periphery of the balance wheel during a portion of its withdrawal movement, imparting a counter clockwise rotative impulse to the balance wheel to positively start the clock mechanism. This function guards against failure of the clock to start when released, due to being at rest on dead-center.

The mechanism controlling the operation of the plunger 6, comprises a centrifugal governor which is mounted within a governor housing 20 and which functions to rock a bell-crank lever 21 pivoted at 22 within the housing. The lever 21 connects by a link 25 with the plunger actuating lever 9, the connection between the lever 21 and the link 25 being a loose sliding connection so that the vibration of the vehicle, due to an idly running motor, will not affect the stop device of the clock.

The governor illustrated, has a governor shaft 27 rotatably journaled at opposite ends in the governor housing 20 and maintained against axial translation by a shoulder 28 engaging one end of the housing and by a collar 29 fixed on the shaft and engaging the opposite end of the housing. A hollow inertia wheel 30 surrounds the shaft 27 and is pivoted thereon by a pivot stud 31, to swing in a plane transverse to the axis of the shaft and to rotate with the shaft. A sleeve 32 is slidable on the shaft and is connected to rotate with the shaft by having longitudinal slots 33—33 cut in its opposed walls and engaging the pivot stud 31. The upper end of the sleeve 32 is flanged to provide a spring abutment which is engaged by a coil spring 34 surrounding the sleeve, the lower end of the spring resting on a washer 39 also surrounding the sleeve and engaging against the pivot stud, 31. Projecting laterally from the lower end of the sleeve 32 is an arm 35 which engages a transverse pin 36 carried by the inertia wheel 30 at one side of its pivotal center. The inner end of the bell-crank lever 21 has a transverse pin 37 which extends laterally within an annular groove 38 formed in the flange at the upper end of the sleeve 32.

The upper end of the governor shaft 27 is provided with a tongue 40 which engages into a companion groove formed in the lower end of the speedometer shaft 41 and the housing 20 is dependingly supported on the speedometer casing by being detachably secured thereto by a screw-threaded coupling 42. The lower end of the governor shaft 27 has a groove adapted to be engaged by the tongue 43 of the terminal coupling 44 of the standard type of speedometer motion transmitting chain, said coupling 44 being retained in engagement with the governor shaft by a sleeve 45 as part of the speedometer cable 47 clamped on the threaded boss of the governor casing by a coupling 46.

In normal condition the brake member 5 maintains the clock stopped, and when the car is put in motion the resulting rotation of the speedometer chain and the governor shaft 27 will cause the inertia wheel 30 and the sleeve 32 to rotate without first affecting the bell-crank lever 21. As the speed of the shaft and inertia wheel increases centrifugal force will cause the inertia wheel to swing on its pivot stud 31. The transverse pin 36 engaging the arm 35 of the sleeve 32 will translate said sleeve axially of the shaft against the normalizing tension of the spring 34. This axial translation of the sleeve will, through the pin and groove connection 37, 38, rock the bell-crank lever 21 and said lever exerting a pull on the connecting link 25 will cause the plunger 6 to be withdrawn from engagement with the spring stop member 5 of the clock brake, allowing the clock mechanism to start as previously described. It, therefore, follows, that as long as the vehicle is traveling, with the resultant rotation of the governor, the plunger 6 will be maintained in outer position and the clock permitted to run, and that as soon as the vehicle is stopped the normalizing spring 34 will swing the inertia wheel 30 to normal position to release the plunger 6 which being forced inward by the spring 11, will move the spring stop member 5 to engage the balance wheel 4 and stop the clock mechanism.

In Fig. 5 there is shown a modified form of operating means for controlling the stop member 5. Said means comprises an electric solenoid 50 supported on the clock case and having a core member 51 projecting into the case. This core member is adapted to be operated through the agency of the vehicle and the solenoid. The core is attached to a spring-device which in turn is the actuating member to control the stop means. This spring-device is constructed so that it is capable of assuming and maintaining itself in either of two positions. The spring device may consist of a spring diaphragm or disc 52 attached at opposite ends to the case and functions, when flexed to either side of an imaginary center line drawn between its points of support, to snap in to the corresponding side to the limit of its flexibility. As shown, when the core 51 is in inner position the spring 52 is bowed inwardly engaging the stop spring member 5 and moving it to balance wheel engaging position in the same manner as the plunger 6 in the previously described mechanical device shown in Fig. 2, and when the core 51 is in reverse or withdrawn position the spring 52 will assume the bowed position illustrated in dotted lines. With this arrangement a quick stop and release of the clock mechanism is obtained and further by this arrangement the solenoid need only be momentarily energized to carry the snap spring 52 past center after which the solenoid may be de-energized, the tension of said snap spring then functioning to carry the core 51 the balance of the stroke and beyond the center of the field of attraction of the solenoid.

I provide means cooperating with the solenoid to energize it when the vehicle gets into motion. This will now be described.

The governor mechanism utilized in connection with this electric control is of similar construction and operation to the governor previously described, the flange 53 of the governor sleeve 32 engaging a spring contact finger 54 secured to a terminal binding post 55 secured to and insulated from the governor casing 20, the casing being grounded as indicated at 56 and the terminal post 55 being connected by wire 57 to one terminal of the solenoid winding. The other terminal of the solenoid winding connects by wire 58 with one side of a battery 59, the other side thereof being grounded as at 60.

The core 51 and the coil 50 are so related to each other that in one position of the spring-device 52 the core will be at one end of the coil and vice versa. Hence the coil will pull the core into it from either position and initiate the shifting movement of the spring device from one of its positions to the other. The spring device, in either case completes the movement that the coil initiates.

In the operation of this form of device, when the vehicle acquires a predetermined speed, the movement of the governor sleeve 32 causes its flange 53 to engage the spring contact finger 54 to complete a circuit to the solenoid which attracts the core 51 to draw the snap spring 52 outwardly past dead center, and as the flange 53 passes the contact finger 54 and breaks the circuit, the tension of the snap spring 52 propels the core to the outward limit of its stroke. Upon the reverse movement of the governor sleeve 32 the operation is reversed, the making of the circuit energizing the solenoid to attract the core to the center of its magnetic field and move the snap spring inwardly past dead center after which the circuit is broken and the tension of the snap spring functions to draw the core to the limit of its inward movement and to translate the spring stop member 5 to engage the balance wheel 4 and stop the clock mechanism.

I claim:

1. In a clock stopping device to cooperate with a vehicle, the combination of a member adapted to be actuated through the agency of the running gear of the vehicle, yielding stop mechanism for stopping the clock, and means positively actuated by said member and engaging the stop means to actuate the same.

2. In combination with a clock mechanism including a balance wheel, means engaging the balance wheel to stop the clock and releasable to permit the clock to run, electric means imparting an initial movement to said stop means, and tension means functioning to complete the movement of the stop means.

3. In combination with a clock mechanism including a balance wheel, means yieldingly engaging said balance wheel under tension to stop the clock and releasable to impart a starting impulse to the balance wheel and permit the clock to run, electric means imparting an initial movement to the stop means, and tension means functioning to complete said movement.

4. In a clock stopping device to cooperate with a vehicle, the combination of a member adapted to be actuated by the running gear of the vehicle, yieldng stop means movable into one position to stop the clock mechanism and into a second position to release the clock mechanism, said stop means constructed so that it operates to maintain itself normally in one of said positions, and means in direct connection with said member and engaging the stop means for positively moving the stop means to one of said positions.

5. In a clock stopping device to cooperate with a vehicle, the combination of a member adapted to be operated through the agency of the running gear of the vehicle, stop means, means operating to hold itself in either of two positions, in one of which positions it actuates the stop means to stop the clock mechanism, said means connected with said member and cooperating with the same to move it from one of its extreme positions to the other.

6. In a clock stopping device to cooperate with a vehicle, the combination of a stop member adapted to engage a moving part of the clock mechanism, an actuating member for controlling the stop member, and capable of assuming two positions in one of which the stop member is applied to a moving part of the clock mechanism and in the other of which the stop member is withdrawn from the moving part of the clock mechanism, a solenoid core connected with the said actuating member and a solenoid coil with means for energizing the same when the vehicle gets into motion, and cooperating with the solenoid core to effect a movement of the actuating member from one of its said positions to the other.

7. In a clock stopping device to cooperate with a vehicle, the combination of a stop member adapted to engage a moving part of the clock mechanism, a spring device for controlling the stop member and capable of assuming and maintaining itself in either of two positions, a solenoid core connected with the spring device, a solenoid coil cooperating with the solenoid core, means for energizing the coil when the vehicle gets in motion, said core and coil being disposed in relation to each other such that the energizing of the coil will pull the core into the coil when it is located at either end of the coil, and initiate a movement of the spring device from one of said positions to its opposite position, said spring device operating to complete the movement initiated by the solenoid.

8. In a clock stopping device to cooperate with a vehicle, the combination of a stop member adapted to engage a moving part of the clock mechanism, a spring device for controlling the stop member and capable of assuming and maintaining itself in either of two positions, a solenoid coil with means for energizing the same when the vehicle gets into motion, a solenoid core connected with the spring device and positioned with respect to the coil so that in one position of the spring device the core lies near one end of the coil and in the other position of the spring device the core lies near the other end of the coil whereby the energizing of the coil will pull the core inwardly from either of its positions and initiate a movement of the spring device from one of said positions to the other, the said spring device operating to complete its movement from one position to the other when initiated by the coil.

9. In a clock stopping device to cooperate with a vehicle, the combination of a stop member adapted to engage a moving part of the clock mechanism, a spring diaphragm for controlling the stop member and capable of assuming and maintaining itself in either of two positions, a solenoid coil having means for energizing the same when the vehicle gets into motion, a solenoid core connected with the diaphragm and positioned with respect to the coil so that in one position of the diaphragm the core lies near one end of the coil and in the other position of the diaphragm it lies near the other end of the coil, whereby the energizing of the coil will pull the core inwardly from either of its positions and initiate a movement of the diaphragm from one of said positions to the other.

10. In a clock stopping device to cooperate with a vehicle, the combination of a stop member consisting of a spring having a free end bent back to form an engaging shoe for engaging the balance wheel of the clock mechanism, means for supporting the stop member so that it tends of its own resiliency to hold the shoe out of contact with the balance wheel and a member adapted to be controlled through the agency of the vehicle for moving the stop member toward the balance wheel to cause the shoe to engage the same, and means in the path of the body of said stop member and limiting the inward movement of the body of the stop member when the shoe is moved to its engaging position.

11. In combination with a clock mechanism including a balance wheel, a spring fixed at one end and having its free end aligned with said balance wheel, a fixed abutment engaging the spring intermediate its ends, and means engaging the spring between its fixed end and the abutment and operable to flex the spring and force its free end into engagement with the balance wheel to stop the clock.

Signed at Los Angeles, California, this 3d day of July, 1920.

GRANT A. BUSH.

Witnesses:
CLARENCE B. FOSTER,
L. BELLE WEAVER.